UNITED STATES PATENT OFFICE.

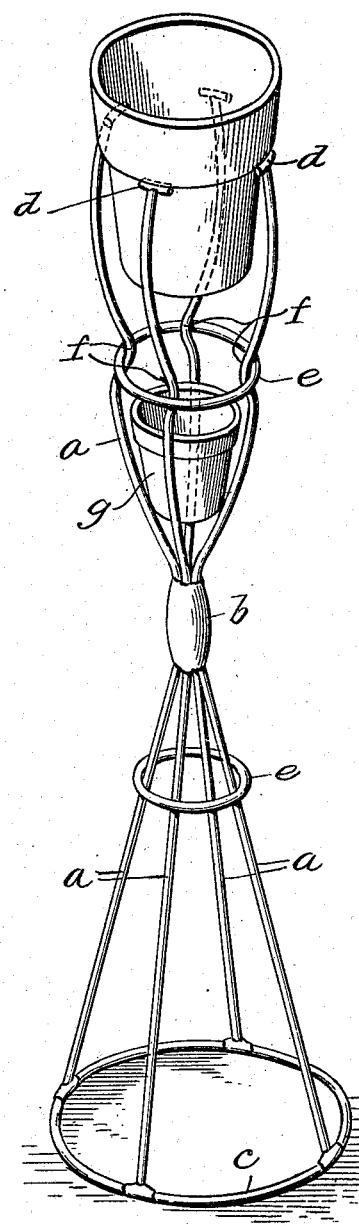

PATRICK FOY, OF ROANOKE, VIRGINIA.

FLOWER-POT STAND.

936,619.

Specification of Letters Patent.  Patented Oct. 12, 1909.

Application filed August 3, 1909.  Serial No. 511,032.

*To all whom it may concern:*

Be it known that I, PATRICK FOY, a citizen of the United States of America, and a resident of Roanoke, county of Roanoke, State of Virginia, have invented certain new and useful Improvements in Flower-Pot Stands, of which the following is a full and clear description, reference being had to the accompanying drawing, in which is represented a perspective view of a stand constructed in accordance with my invention.

The object of this invention is to provide a simple and durable stand which shall be adapted to support individual flower pots and which shall be adapted to be readily moved about on the floor or upon a support and be properly placed with regard to its surroundings, and which shall be neat and ornamental in appearance, especially when the pot contains a growing plant.

Another object is to adapt the stand for flower pots of different sizes, and a still further object is to provide a supplemental or drip-pot which shall catch the drip from the main pot and which is itself capable of being used for small plants of that variety which naturally require an unusual amount of moisture, as more fully hereinafter set forth.

Referring to the drawings by reference-characters, $a$ designates a series of upright steel rods which are fastened together about mid-way their length by a suitable lead or other coupling $b$. From this coupling the rods diverge downwardly and form legs, and in order that the stand may have a firm footing these legs are connected together at their lower extremities by a ring $c$. A base portion formed in this manner affords a firm strong and ornamental support for the stand. Above the coupling $b$ the rods again diverge upwardly and they are made resilient so as to be capable of radial movement. The flower pot is adapted to be suspended within the cage formed by the spring fingers, the upper ends of the rods engaging under the flange on the upper edge of the pot. In order that the pot may have a firm support each of the upper ends of the fingers is provided with a short transverse bar $d$. These fingers are clamped upon the pot by means of a ring $e$ which surrounds the fingers and rests in inwardly-extending bends $f$ formed in the fingers, the shoulders in the fingers below these bends being rounded so that the ring may be forced upwardly over the shoulders and allowed to engage and rest in the bends and be thereby held in place.

In placing a pot in position in this stand, a ring of the proper size to suit the particular pot is first forced upwardly until it snaps into the bent portions of the fingers and then the pot is forced down between the fingers, whereby the pot will be firmly clamped and supported. The pot may be readily moved upward from between the fingers without sliding the ring downwardly out of its locking position. If a different sized pot is to be placed in the stand, the ring is forced downwardly out of the notches or bends and a ring of another size is forced upwardly into the notches, the size of the ring being such that when it is in place it will cause a clamping action of the fingers against the pot side. Two or more of these rings will usually be attached to each stand, and the ring or rings not in use will fall down and rest upon the tapering base portion, as shown. The stand having the hour-glass shape shown, the rings will be held in place on the stand at all times ready for use, accidental detachment being impossible. It will be understood that the pot grasping fingers spring inwardly far enough to grasp the smallest pot and that when the pot is pushed down between the fingers the fingers will lightly clasp the pot, and that the clamp ring is simply for the purpose of locking or clamping the fingers against the pot to prevent accidental dislodgment of the same from between the fingers.

The upwardly diverging fingers form a vase-like cage or holder for a small pot $g$ which is supported centrally under the main pot and is adapted to receive and hold the drip therefrom. This drip pot may be used for growing water plants, and when thus used in connection with the larger pot above, an extremely ornamental and pleasing effect is produced.

Having thus fully described my invention, what I claim as new, and desire to secure by Letters Patent, is—

1. A flower pot stand consisting of a series of rods fastened together about mid-way their length and diverged downwardly and upwardly therefrom, means connecting the downwardly extending rods to form a rigid base portion and the upwardly extending portions of the rods being resilient to form a receptacle for a flower pot and a drip pot, said upwardly extending rods being provided with inwardly bent portions, and a clamp ring secured to the stand by the oppositely diverging portions of the rods and adapted to be sprung upwardly into said bent portions, for the purpose set forth.

2. A flower pot stand consisting of a series of rods attached together at a point between their ends, the lower portions being diverged to form a broad base portion and the upper portions being resilient and adapted to clasp and hold the pot, said upper portions also forming a cage for a supplemental or drip pot directly below the upper or main pot, for the purposes set forth.

In testimony whereof I hereunto affix my signature in the presence of two witnesses this 2nd day of August 1909.

PATRICK FOY.

Witnesses:
W. P. STEPHENSON,
M. C. KEELEY.